United States Patent
Zimmermann et al.

(10) Patent No.: US 10,331,510 B2
(45) Date of Patent: Jun. 25, 2019

(54) SIMULATION BASED FAULT DIAGNOSIS USING EXTENDED HEAT FLOW MODELS

(75) Inventors: Gerhard Zimmermann, Kaiserslautern (DE); Yan Lu, West Windsor, NJ (US); George Lo, Plainsboro, NJ (US)

(73) Assignee: SIEMENS CORPORATION, Iselin, NJ (US)

( * ) Notice: Subject to any disclaimer, the term of this patent is extended or adjusted under 35 U.S.C. 154(b) by 1004 days.

(21) Appl. No.: 14/119,899

(22) PCT Filed: May 23, 2012

(86) PCT No.: PCT/US2012/039085
§ 371 (c)(1),
(2), (4) Date: Nov. 25, 2013

(87) PCT Pub. No.: WO2012/162360
PCT Pub. Date: Nov. 29, 2012

(65) Prior Publication Data
US 2014/0095935 A1    Apr. 3, 2014

Related U.S. Application Data

(60) Provisional application No. 61/488,871, filed on May 23, 2011.

(51) Int. Cl.
| G06F 11/07 | (2006.01) |
| H04L 12/28 | (2006.01) |
| G05B 23/02 | (2006.01) |

(52) U.S. Cl.
CPC ........ *G06F 11/079* (2013.01); *G05B 23/0251* (2013.01); *H04L 12/2823* (2013.01); *H04L 12/2827* (2013.01)

(58) Field of Classification Search
CPC ............... G06F 11/079; G05B 23/0251; H04L 12/2823; H04L 12/2827
See application file for complete search history.

(56) References Cited

U.S. PATENT DOCUMENTS

| 6,073,089 A | 6/2000 | Baker |
| 2002/0029575 A1 | 3/2002 | Okamoto |
| 2007/0008879 A1 | 1/2007 | Wallenius |

(Continued)

OTHER PUBLICATIONS

Qin et al., "A fault detection and diagnosis strategy of VAV air-conditioning systems for improved energy and control performances", Energy and Buildings, vol. 37, Issue 10, Oct. 2005, pp. 1035-1048.*

(Continued)

*Primary Examiner* — Rehana Perveen
*Assistant Examiner* — Chuen-Meei Gan

(57) ABSTRACT

In order to reduce computation time and cost involved with detecting and diagnosing a fault in a system, simplified representations of components of the system are used to estimate valid intervals for state variables at the components. Generic failure rules are configured to compare the estimated valid intervals to related intervals for the same state variables, from either observations or propagations, for overlap. Failure output vectors are generated based on the comparison, and the failure output vectors are compared to diagnostic matrices to determine a source of the fault.

18 Claims, 6 Drawing Sheets

(56) References Cited

U.S. PATENT DOCUMENTS

2008/0015726 A1* 1/2008 Harvey, Jr. ........ G05B 23/0251
　　　　　　　　　　　　　　　　　　　　　　700/110
2008/0209030 A1　　 8/2008 Goldszmidt
2011/0093424 A1* 4/2011 Zimmermann ........ G05B 17/02
　　　　　　　　　　　　　　　　　　　　　　706/47

OTHER PUBLICATIONS

"Dependability of Embedded Networks—A Case Study with System Diagnosis of CAN Protocol", Aktouf, et al.; Intelligent Transport Systems Telecommunication, (ITST), 2009 9th Int'l Conference ON, IEEE, Piscataway, NJ US; pp. 552-556, XP031619126; US.
International Search Report dated Nov. 21, 2012.

* cited by examiner

SIMULATION BASED FAULT DIAGNOSIS USING EXTENDED HEAT FLOW MODELS

RELATED APPLICATIONS

The present patent document claims the benefit of the filing date under 35 U.S.C. § 119(e) of Provisional U.S. Patent Application Ser. No. 61/488,871, filed May 23, 2011, which is hereby incorporated by reference.

FIELD

The present embodiments relate to fault diagnosis.

BACKGROUND

Complex technical systems, such as heating, ventilation, and air conditioning (HVAC) systems, in large buildings are subject to aging processes, operating errors, and other influences that may lead to hardware or software defects. When defects exceed certain limits, the defects may be referred to as faults that cause failures. Failures in the HVAC system may result in degraded energy efficiency, loss of user satisfaction, reduction of the lifetime of the system, or complete system malfunctions.

Only some severe failures are displayed as alarms by the HVAC system, while many malfunctions are not automatically noticed by occupants or system operators. Fault detection and diagnosis (FDD) systems detect all possible failures and localize the faults. Localizing the faults may reduce the time to find and repair faulty components and thus reduce maintenance cost and system down times.

Because of the diversity of buildings and HVAC systems, FDD systems may be specialized (e.g., HVAC system-specific). For example, the relations between the faults and the failures may be derived offline through exhaustive examination of the possible failures caused by each fault from a fault list for a given HVAC system. Single or multiple faults may be inserted into an off-line fault simulation, where failure rules may be exercised, creating the relations between the faults and the failures.

Fault-failure relations, however, depend on external influences such as outdoor temperature, manual set-points and space occupancy. With the exhaustive approach, the HVAC system-specific and condition-specific FDD systems may result in high computation time and cost.

SUMMARY

In order to reduce computation time and cost involved with detecting and diagnosing a fault in a system, simplified representations of components of the system are used to estimate valid intervals for state variables at the components. Generic failure rules are configured to compare the estimated valid intervals to related intervals for the same state variables, from either observations or propagations, for overlap. Failure output vectors are generated based on the comparison, and the failure output vectors are compared to diagnostic matrices to determine a source of the fault.

In a first aspect, a method for diagnosing a fault in a system is provided. The system includes a plurality of components. The method includes determining, by a processor, a first range of values for a variable representing a state associated with at least a component of the plurality of components. The method also includes comparing the determined first range of values for the variable to a second range of values for the variable. The method includes determining a failure value associated with the component based on the comparison, and determining when the fault is associated with the component based on the failure value.

In a second aspect, a non-transitory computer-readable storage medium that stores instructions executable by one or more processors to identify an origin of a fault in a system is provided. The system includes a plurality of components. The instructions include determining, for each of at least two components of the plurality of components, a valid first interval for a variable representing a state associated with the component. The instructions also include determining, for each of the at least two components of the plurality of components, a second interval for the variable representing the state associated with the at least two components of the plurality of components. The instructions include comparing, for each component of the at least two components, the second interval to the valid first interval, and identifying the origin of the fault based on the comparison.

In a third aspect, a system for identifying an origin of a fault in a thermodynamic system is provided. The thermodynamic system includes a plurality of heating, ventilation, and air conditioning (HVAC) components. The system includes an input operable to receive data for a variable representing a state associated with an HVAC component of the plurality of HVAC components. The system also includes a processor operatively connected to the input. The processor is configured to determine a valid first range of values for the variable and determine a second range of values for the variable based on the received data. The processor is also configured to compare the determined valid first range of values for the variable to the second range of values for the variable. The processor is configured to determine a failure value associated with the component based on the comparison. The failure value at least partially represents a probability that the fault is at the HVAC component. The processor is also configured to determine when the fault is associated with the HVAC component based on the failure value.

In a fourth aspect, a system for diagnosing a fault in a heating, ventilation, and air conditioning (HVAC) system is provided. The HVAC system includes a plurality of components. The system includes means for determining a first range of values for a variable representing a state associated with at least a component of the plurality of components. The system also includes means for comparing the determined first range of values for the variable to a second range of values for the variable, means for determining a failure value associated with the component based on the comparison. The system includes means for determining when the fault is associated with the component based on the failure value.

The present invention is defined by the following claims, and nothing in this section should be taken as a limitation on the claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS

Based on a method of generating fault detection systems from building information models, an extension of underlying heat flow models to implement a diagnosis engine and thus create a complete software system is provided. The diagnosis uses an associate network to map dynamically reported failure rule vectors to a small set of probable faults. The associative network is automatically created at every time-step through fault simulation that takes current conditions such as outdoor temperature, set-points, and occupancy into account, while keeping engineering costs low.

In a fault detection method, a heat flow model represents components (e.g., coils and fans) and mass flow connections (e.g., pipes and ducts) of a heating, ventilation, and air conditioning (HVAC) system (e.g., an observed system) as a directed graph of nodes and connections (e.g., arcs). Valid intervals (e.g., a range of values) for local state variables (e.g., temperature and flow rate) are estimated for each node based on data for properties of components of the HVAC system, state variables of connected nodes (e.g., downstream and upstream) and dynamic inputs from the HVAC system (e.g., sensor values, set-points, and control values).

The estimated intervals may be propagated to both downstream and upstream nodes through the directed arcs. Generic failure rules are configured to compare related intervals from either observations or propagations for overlap. Related intervals are, for example, a sensor value with applied sensor tolerances and the estimated value interval from propagations. If the intervals do not overlap, a failure value is reported. At every time step (e.g., every five minutes), a failure output vector (e.g., including failure values derived from the related intervals for the HVAC system) may be created for the observed system. The failure output vectors over time are pattern-matched to fault signature matrices (e.g., diagnostic matrices). The fault signature matrices are generated in real-time using the heat flow model to identify a source of fault.

Use of the heat flow model for comparison with the matrices may avoid review of all possible failure in a fault list. Since all the possible failures caused by each fault from a fault list for a given HVAC system do not have to be examined offline, the fault detection may decrease computation time and cost for fault detection. The fault detection may also improve the reliability of the fault diagnosis, since the fault detection is based on current HVAC system mode and weather conditions.

Figure 1:
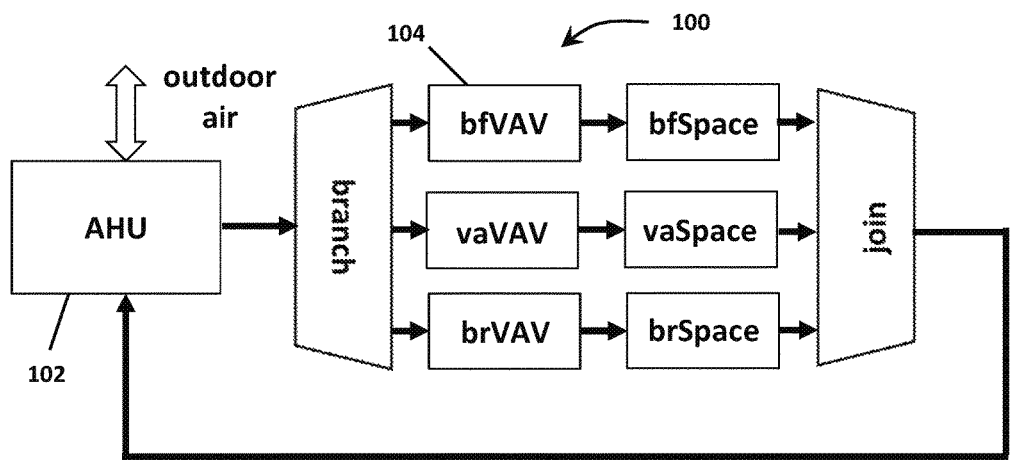
FIG. 1 shows a layout of an example heating, ventilation, and air conditioning (HVAC) system.

FIG. 1 shows a layout of an example heating, ventilation, and air conditioning (HVAC) system 100 that may be used in a building. The building may, for example, be a one-floor small building with three zones e.g., a first zone bf, a second zone va, and a third zone br). Hot or cold air is supplied by an air handling unit (AHU) 102 to the first zone bf, the second zone va, and the third zone br. Each of the first zone bf, the second zone va, and the third zone br includes a hot water reheat variable air volume (VAV) box 104. A space in each of the first zone bf, the second zone va, and the third zone br (e.g., a first space bfSpace, a second space vaSpace, and a third space brSpace) is equipped with a thermostat for the control of the room temperature. An air supply temperature of the AHU 102 is set based on the outdoor temperature. The AHU 102 includes an economizer (e.g., a mixing box), and a controller of the AHU 102 has four modes: mode 1—minimum outdoor air and heating with a heating coil; mode 2—cooling with outdoor air only; mode 3—cooling with maximum outdoor air and a cooling coil; and mode 4—cooling with minimum outdoor air and a cooling coil. Other modes may be used. In other embodiments, the HVAC system 100 may include additional, fewer, or different components. The HVAC system 100 may be used in a larger or smaller building with more or fewer zones.

Figure 2:
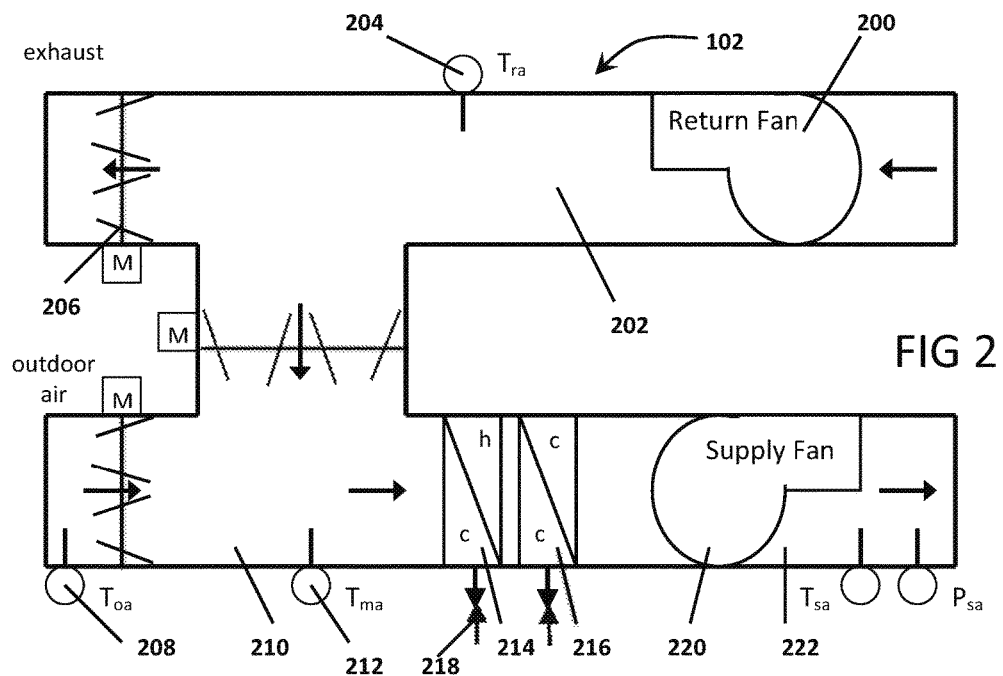
FIG. 2 shows the layout of an example air handling unit (AHU) of the HVAC system of FIG. 1.

FIG. 2 shows an exemplary layout of the AHU 102 of the HVAC system 100 of FIG. 1 or another HVAC system. The AHU 102 includes a return fan 200 (e.g., Rfan) and a duct 202 (e.g., Rduct) with a return air temperature sensor 204 (e.g., $T_{ra}$). The AHU 102 also includes a mixer (e.g., an economizer) that includes three coupled dampers 206 and an outdoor air temperature sensor 208 (e.g., $T_{oa}$). The AHU 102 includes a duct 210 (e.g., Mduct) having a mixed air temperature sensor 212 (e.g., $T_{ma}$), and a heating coil 214 (e.g., Hcoil) and a cooling coil 216 (e.g., Ccoil) with valves 218. The AHU 102 also includes a supply fan 220 and a duct 222 (e.g., Sduct). The duct 222 receives the supply air temperature set point. The AHU 102 may include more, fewer, or different components.

Fault detection and diagnosis (FDD) of the present embodiments includes identifying (e.g., receiving or generating) a heat flow model (HFM) of the HVAC system 100 of FIGS. 1 and 2 or another system. The HFM is a directed graph that includes heat flow nodes and edges connecting the nodes. The nodes may represent components (e.g., a duct, a heating coil, and a cooling coil) of the HVAC system 100, and the edge connections may represent, for example, mass flow between the components of the HVAC system 100. A user or a processor may identify (e.g., generate) the HEM using a software program including a graphical user interface (GUI) at a computing device. The user may be able to select from a memory of the computing device and/or generate, within the software program, modules that represent the components of the system and arrange the modules within the GUI to represent the system. The user may also be able to connect the modules within the GUI, such that data may be passed between the different connected modules. The processor of the computing device may make calculations at each of the modules of the GUI representing changes (e.g., in temperature and pressure) across the components of the system. The HEM may represent other systems including, for example, airplanes and power plants. In alternative embodiments, the HEM is obtained from memory or generated by a processor from planning or layout information.

Figure 3:
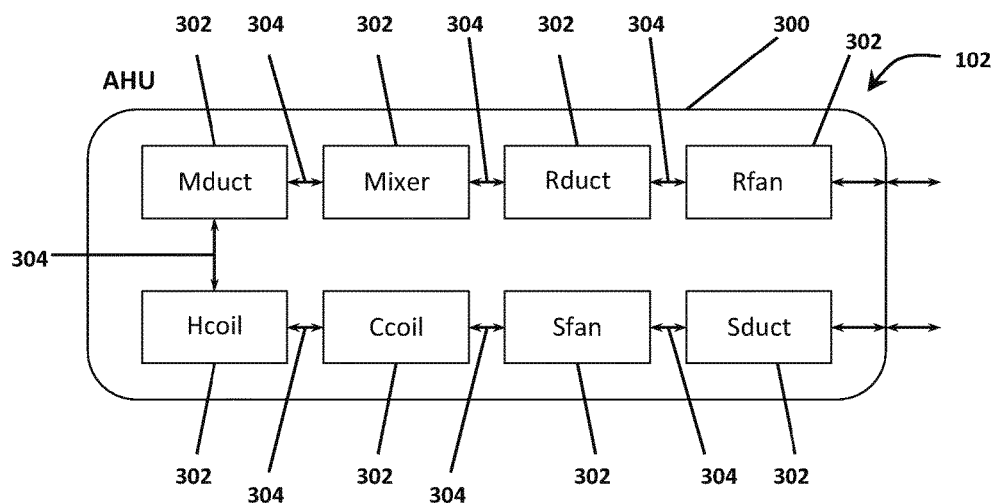
FIG. 3 shows an exemplary simplified heat flow model (HFM) of the AHU of FIG. 2.

FIG. 3 shows a simplified HFM 300 of the AHU 102 of FIG. 2 or another AHU (e.g., as displayed within the GUI). The HEM 300 includes a plurality of nodes 302 and a plurality of connections 304 connecting the plurality of nodes 302. As discussed above with relation to the AHU 102, the HFM 300 may include nodes 302 representing a return fan (e.g., Rfan), a first duct (e.g., Rduct), a mixer (e.g., Mixer), a second duct (e.g., Mduct), a heating coil, (e.g., Hcoil), a cooling coil (e.g., Ccoil), a supply fan (e.g., Sfan) and a third duct (e.g., Sduct). The HEM 300 may include more or fewer nodes 302 representing more or fewer components of a HVAC system. In one embodiment, at least one node 302 of the plurality of nodes 302 of the HFM 300 may represent a different component.

The plurality of connections 304 may represent forward and/or reverse propagation of flow vectors (e.g., air, water, or electricity). The flow vectors include flow state variables representing, for example, temperature, flow rate, pressure, current, voltage, and/or humidity. Other flow state variables may be used.

The nodes of the HFM 300 may represent simple and/or complex HVAC system components or other components. For example, a valve may be a simple HVAC system component, while the AHU 102 may be a complex HVAC system component. A given node may represent the valve or the AHU 102. Determining a complexity level, at which the nodes are selected, may be an engineering decision for the user. The goal may be to keep the number of nodes within the HFM small (e.g., less than 10 or less than 100 nodes), while making the nodes as generic as possible. Making the nodes as generic as possible may make the use of HVAC system-specific HFM unnecessary. Modeling at the component level may be more generic than modeling at the system level or the subsystem level. In one embodiment, the nodes may be at a complexity level, as shown in FIG. 3 (e.g., representing coils including valves, mixing boxes, and ducts with sensors). In another embodiment, the nodes may be at a higher complexity (e.g., variable air volume (VAV) boxes or spaces as nodes). The nodes of a given model represent similar levels of complexity. Alternatively, different nodes within a same model are at different levels of complexity.

Figure 4:
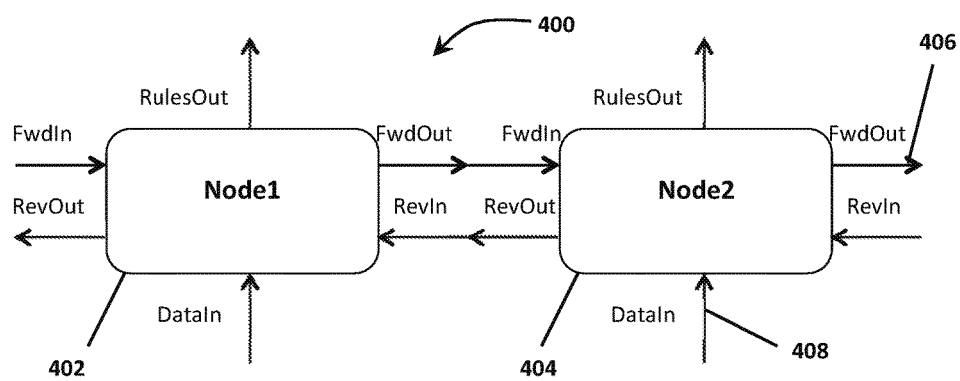
FIG. 4 shows an example of a two node HFM.

The flow nodes of the HFM of the HVAC system 100 have sink and source ports for the bidirectional propagation of flow vectors. To illustrate the flow of data within an HFM, FIG. 4 shows an example of a two node HFM 400 representing at least part of an observed system (e.g., the HVAC system 100). The HFM 400 includes a first node 402 and a second node 404. The first node 402 is connected to the second node 404 via anti-parallel arcs 406 (e.g., anti-parallel edges or connections). Forward arcs 406 (e.g., Fwd) follow a main mass flow direction, and reverse arcs 406 (e.g., Rev) are against the main mass flow direction. The anti-parallel arcs 406 (e.g., FwdIn, FwdOut, RevIn, and RevOut) represent the forward and reverse propagation of flow vectors (e.g., connections 304; air, water, or electricity). The flow vectors include flow state variables representing, for example, temperature, flow rate, pressure, and/or humidity. The flow vectors may represent different state variables. Additional arcs 408 represent data transmitted from the observed system (e.g., DataIn; temperature measurements and control values), and failure rule values (e.g., RulesOut) transmitted to a diagnostics system (e.g., a module within the GUI of the software program). For example, nodes may also receive sensor (e.g., Sens), set-point (e.g., Setp), and control (e.g., Ctrl) values during run-time of the HFM of the HVAC system 100. Set-point values may be input by the user, for example, at the computing device or may be identified within a memory of the computing device by the processor. The processor, for example, may identify sensor measurements stored in the memory or transmitted to an input of the computing device. Some variables internal to the nodes (e.g., Int) may be calculated within the nodes, but may not be visible outside of the nodes. Parameters for the nodes of the HFM may be configured (e.g., by the user or the processor) during setup of the HFM of the HVAC system 100. Data inputs (e.g., DataIn) and rule outputs (e.g., the failure rule values; RulesOut) may be connected with a building energy management and control system (BEMCS) of the observed HVAC system 100.

The nodes of the HFM of the HVAC system 100 (e.g., including the first node 402 and the second node 404) may perform at least two functions for fault detection: flow state variable estimation and rule evaluation. Using the hot water heating coil (e.g., the heating coil Hcoil of FIG. 3) as an example, full simulation of a forward out air temperature may use a detailed physical model of the hot water heating coil, an air input temperature and flow rate, and a hot water supply temperature and flow rate. Water supply data (e.g., the hot water supply temperature and flow rate) may not be available. Additionally, the full simulation may require more computation time and resources than the simplified simulation.

Figure 5:
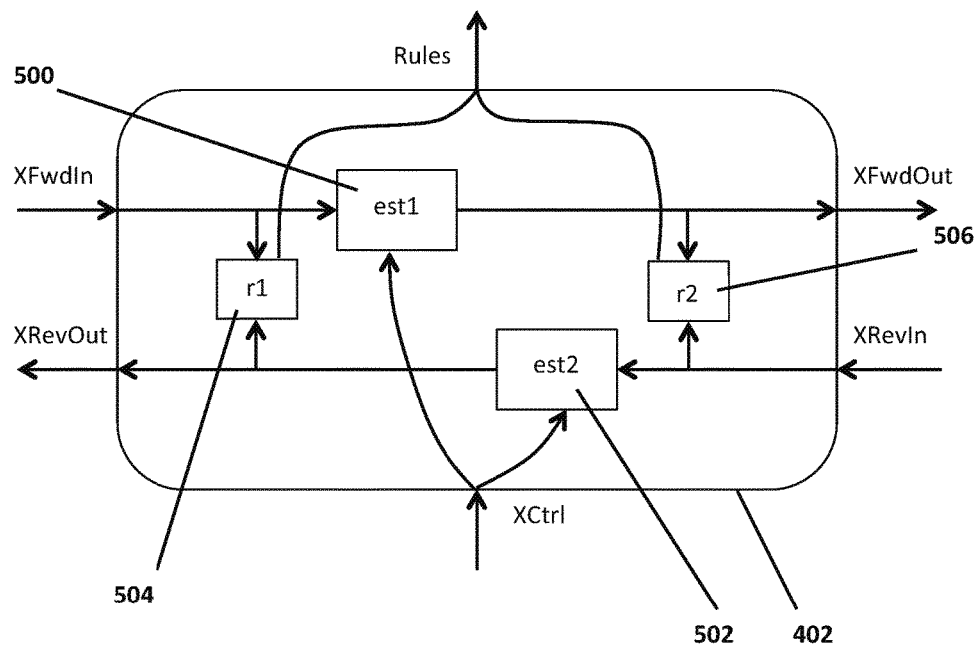
FIG. 5 shows one embodiment of a controlled transformation node.

FIG. 5 shows the estimation of the flow state variables may be a simplified simulation (e.g., within the first node 402). For reuse (e.g., modularity) purposes, the nodes (e.g., the first node 402 and the second node 404) may be represented by a small number of different types of nodes and may be parameterized to create many instances and build up the HFM of the HVAC system 100, for example. FIG. 5 shows one embodiment of a controlled transformation node. For example, a simplified simulation of a heating coil may use known design data (e.g., node parameters; maximum and minimum temperature increases for a fully open hot water valve) to estimate the forward air temperature. Different physical models for the air temperature transformation may be applied, depending on the data available. In one embodiment, the air input temperature, a maximum coil heating power, and a valve control value (e.g., CtrlIn; TaCtrl control value) may be used to estimate the forward out air temperature of the heating coil. It may be assumed that for a fully open valve, a maximum and a minimum temperature increase is known from technical coil data and hot water supply system settings.

Estimations include tolerances. Therefore, a flow state variable X is represented by an interval $\overline{X}$ (e.g., a range of values) shown below as equation (1):

$$\overline{X} = [X_{min}, X_{max}] \quad (1)$$

The flow state variable X may be represented by the interval $\overline{X}$, since tolerances may not always follow normal distributions.

For the simplified simulation of the heating coil, for example, an air temperature heating interval $\overline{dTaHCoil}$ may be assumed to be a constant parameter. It may also be assumed that the air temperature increase is proportional to the TaCtrl control value, and the air temperature increase is independent of the air flow rate through the heating coil. The forward air temperature may be estimated, as expressed below in equation (2):

$$TaFwdOut\downarrow_{min} = TaFwdIn\downarrow_{min} + TaCtrl * dTaHCoil\downarrow_{min}$$

$$TaFwdOut\downarrow_{max} = TaFwdIn\downarrow_{max} + TaCtrl * dTaHCoil\downarrow_{max}$$

$$TaRevOut\downarrow_{min} = TaRevIn\downarrow_{min} - TaCtrl * dTaHCoil\downarrow_{max}$$

$$TaRevOut\downarrow_{max} = TaRevIn\downarrow_{max} - TaCtrl * dTaHCoil\downarrow_{min} \quad (2)$$

The $\overline{dTaHCoil}$ interval may be large due to uncertainties in the hot water temperature and the flow rate. In the case of TaCtrl=0 (e.g., true for all AHU modes except the heating mode), the output intervals are equal to the input intervals, and failure rules are fully applicable, for example, to detect a leaking valve. In one embodiment, the air temperature increase after the heating coil is assumed proportional to the TaCtrl control value with some nonlinearity factors between the extremes of the TaCtrl control value.

Another example of a controlled transformation node is the mixing box of the AHU 102, for example. The mixing box includes three synchronized dampers and an outdoor air temperature sensor ToaSens. The sensor values are not propagated as flow vectors but are used internal to the node. A control value DmCtrl (e.g., CtrlIn) range may be assumed to be [0, 1]. The value 0 provides that exhaust and fresh air dampers of the mixing box are fully closed, and a return air damper of the mixing box is fully open. The value 1 provides that the exhaust and the fresh air dampers of the mixing box are fully open, and the return air damper of the mixing box is fully closed. A minimum value for exhaust and fresh air dampers (e.g., 0.1) is used to provide enough air exchange. A nonlinearity parameter modifies the control interval $\overline{DmCtrl}$ width such that the control interval $\overline{DmCtrl}$ width has a maximum for DmCtrl=0.5 and is 0 for fully open or closed.

As shown in FIG. 5, the first node 402, for example, calculates a FwdIn air temperature increase in a first estimator 500 and transmits the result as FwdOut to the next node downstream (e.g., the second node 404). In the reverse path, the downstream node (e.g., the second node 404) transmits an air temperature that is RevIn for the heating coil (e.g., the first node 402), and a second estimator 502 calculates a corresponding RevOut temperature for a next upstream node (e.g., the second node 404 if the HFM includes two nodes; another node if the HFM includes more than two nodes).

The estimates may be used for application of rules. A first generic failure rule 504 and a second generic failure rule 506 (e.g., generic failure rules) compare temperatures from propagations and estimations and generate failure values. An assumption to define the generic failure rules is that two intervals expressing the same state variable (e.g., temperature) should overlap with high probability if no failures exist. If the two intervals do not overlap, a failure is assumed with high probability. If the two intervals do not overlap, it may be assumed that the probability of a failure increases with the distance between the two intervals. The positive or negative distance between the two intervals is defined by:

$$ruleX1X2 = r(\overline{X1}, \overline{X2}) \quad (3)$$

$$= \begin{cases} X2_{min} - X1_{max} & \text{if } X2_{min} > X1_{max} \\ X2_{max} - X1_{min} & \text{if } X2_{max} < X1_{min} \\ 0 & \text{else} \end{cases}$$

In other words, if the intervals define valid state values (e.g., as at least partially defined by maximum and minimum temperature increases for a fully open hot water valve) and overlap, no fault is assumed, and the failure rule reports zero. If the intervals do not define valid state values and do not overlap, the failure rule reports nonzero values based on equation (3) above. The larger the failure value (e.g., negative or positive), the higher is the probability that faults exist. In order to make failure values comparable, the failure values may be normalized with a factor that is set to an expected state variable range. The results of all failure rule evaluations create, for example, a normalized rule vector R={$r_1$, $r_2$, ..., $r_n$} at every time step. In one embodiment, the failure values are not normalized. The generic rules 504 and 506 may be evaluated locally in a node (e.g., the first node 402 or the second node 404), thus providing modularity. Other failure rules may be used.

Generic rule examples that may be used depending on the type of node (e.g., the component the node represents and/or the information that is available for the node) are given below:

$rFwd = r(\overline{XFwdIn}, \overline{XRevOut})$ $rRev = r(\overline{XRevIn}, \overline{XFwdOut})$ $rFwdSens = r(\overline{XSens}, \overline{XFwdIn})$ $rRevSens = r(\overline{XSens}, \overline{XRevIn})$ $rSetp = r(\overline{XSetp}, \overline{XSens})$ $rInt = r(\overline{XInt}, \overline{XSens}) \quad (4)$ Using FIG. 5 as an example, rFwd may compare, at the second node 404, for example, the interval for a state variable transmitted from the first node 402 to the RevOut interval of the state variable calculated at an estimator of the second node 404. X may be any number of flow state variables including, for example, temperature.

As another exemplary type of node, a transformation node may represent, for example, a return fan (e.g., the return fan 200; ReturnFan) or a supply fan (e.g., the supply fan 220; SupplyFan). Both fans increase the air temperature by a constant amount $\overline{dTaFan}$ by assuming that the electric energy consumption of a fan Pfan is proportional to an air flow rate QaFwdIn, as shown below:

$$dTaFan = TaFwdOut \quad (5)$$
$$- TaFwdIn = \frac{Pfan}{QaFwdIn * ca}$$
$$Pfan = QaFwdIn * P0$$
$$dTaFan = P0/ca,$$

where ca is the air heat capacitance, and P0 is a constant. This results in the temperature estimation, as defined by equation (6) below:

$TaFwdOut\downarrow_{min} = TaFwdIn\downarrow_{min} + dTaFan\downarrow_{min}$ $TaFwdOut\downarrow_{max} = TaFwdIn\downarrow_{max} + dTaFan\downarrow_{max}$ $TaRevOut\downarrow_{min} = TaRevIn\downarrow_{min} - dTaFan\downarrow_{max}$ $TaRevOut\downarrow_{max} = TaRevIn\downarrow_{max} - dTaFan\downarrow_{min} \quad (6)$ It may be assumed that the supply fan 220 is controlled internally to produce a constant forward pressure interval paFwdOut. The return fan 200 may follow the supply fan 220 such that the pressure balance in the whole air flow system is properly maintained.

Figure 6:
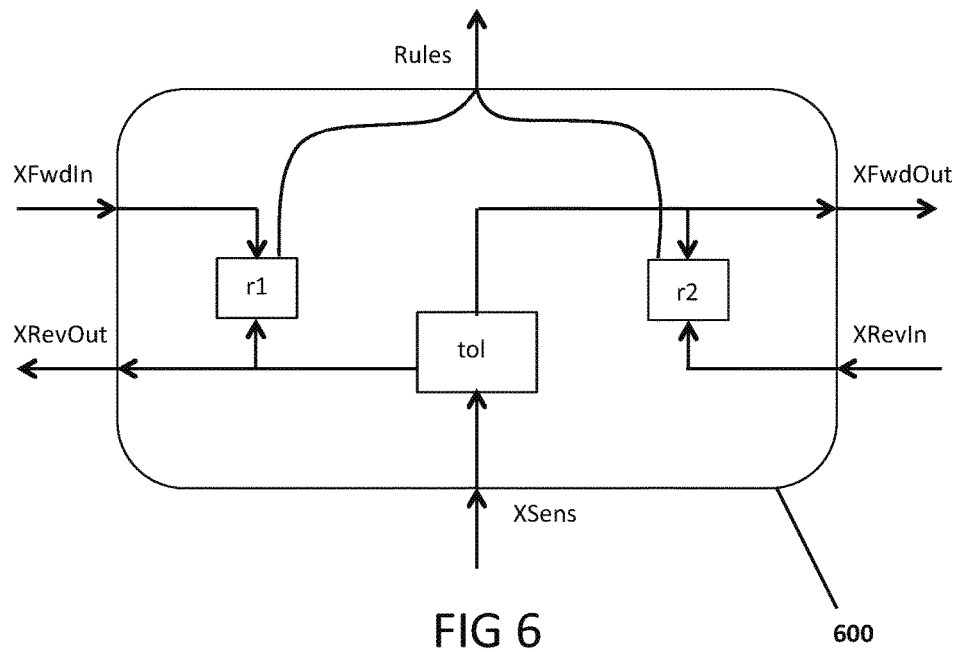
FIG. 6 shows one embodiment of a sensor node.

Other exemplary types of nodes are discussed below with reference to FIG. 6-8. FIG. 6 shows an exemplary sensor node 600 (e.g., the first node 402 or the second sensor 404). Sensor nodes may, for example, be ducts or pipes with one or more sensors for different state variable measurements. It may be assumed that sensor intervals are smaller than the intervals of flow input vector values. Therefore, the propagated flow output vector values may be equal to the sensor values, as expressed in equation (7):

$\overline{XFwdOut} = \overline{RevOut} = \overline{XSens} \quad (7)$

Sensors used in the FDD of the present embodiments may have tolerances. The tolerances are model parameters that may be extracted from data specifications for the sensors (e.g., $T_{tol}$ for a temperature sensor; tol). For a temperature sensor, for example, this results in the interval:

$$T=[T_{sens}-T_{tol}, T_{sens}+T_{tol}] \quad (8)$$

Figure 7:
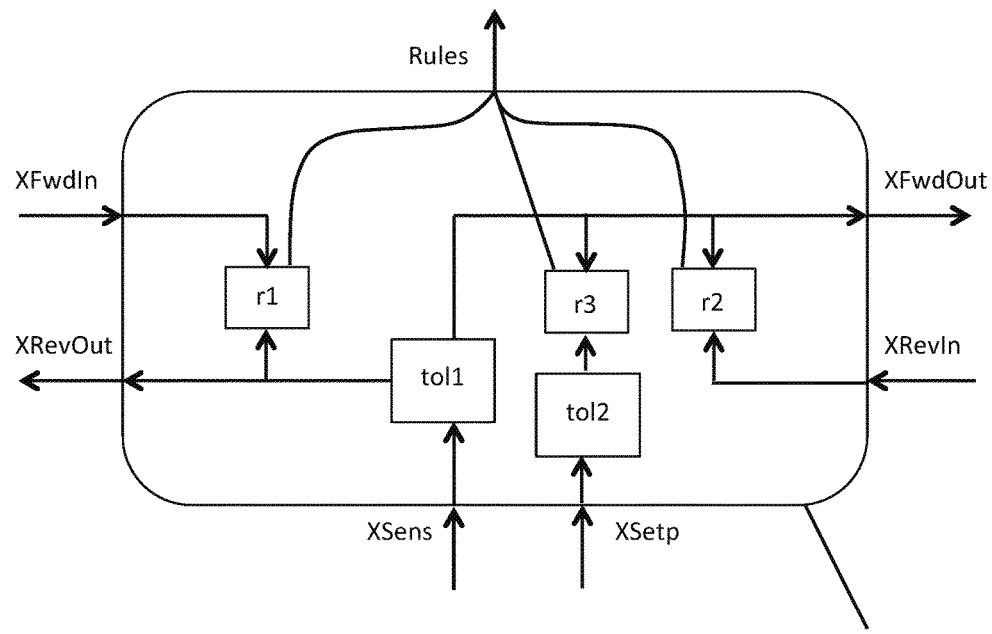
FIG. 7 shows one embodiment of a sensor node with set-point.

FIG. 7 shows an exemplary sensor node 700 with a set-point. The sensor node 700 has additional set-point inputs. The set-points also have tolerances that determine how far the controlled variable (e.g., the sensor value) may deviate before a failure is recorded. The sensor node 700 with the set-point may represent, for example, the duct 222 (e.g., Sduct).

Figure 8:
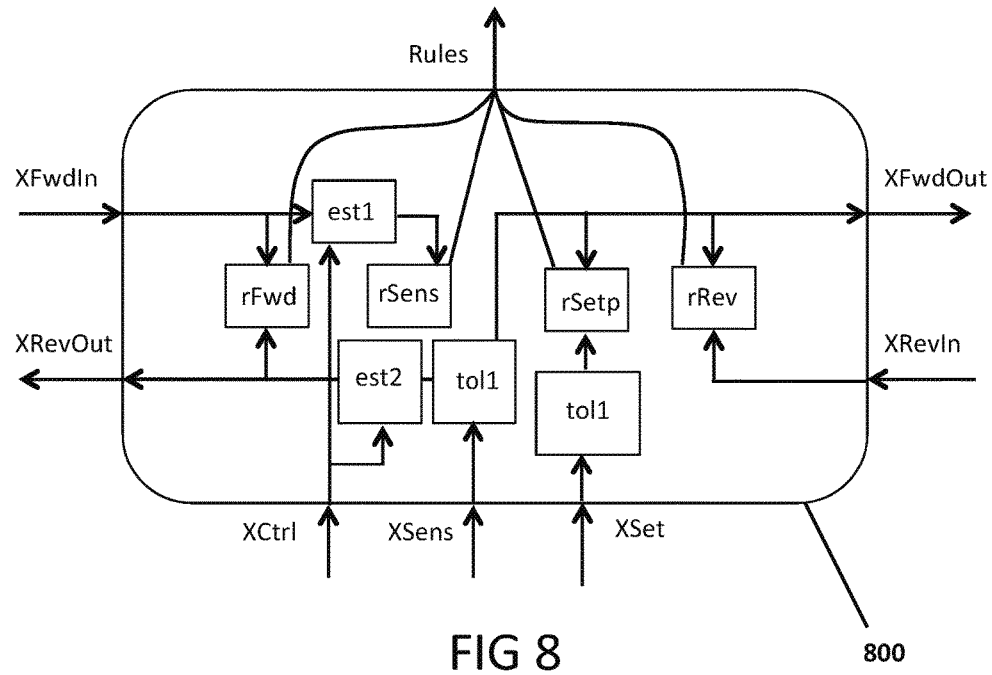
FIG. 8 shows one embodiment of a complex node.

FIG. 8 shows an exemplary complex node 800. In complex nodes, some estimated values may not be propagated to other nodes, but are used in rule evaluations. The complex node 800 may, for example, represent the VAV box 104, the space in the first zone bf, the space in the second zone va, or the space in the third zone br in the HVAC system 100. For the VAV box 104 (e.g., VAV node 800), for example, a flow rate is estimated according to a damper control value (e.g., XCtrl). The damper control value is compared to a flow rate sensor value (e.g., XSens) using a sensor rule. The forward input air temperature interval (e.g., XFwdIn) is transformed by a reheat coil and the result is compared to an air temperature sensor (e.g., XSens) by a second sensor rule. Both sensor intervals are propagated forward. The reverse flows (e.g., XRevIn) are handled similarly. If the VAV node 800 has no set-point input for a discharge air temperature, a set-point rule is not activated.

For one of the spaces (e.g., in the first zone bf, the second zone va, or the third zone br) in the HVAC system 100, for example, the complex node 800 is modeled as a function of the air input flow rate and temperature, external heat flows, and internal fixed and occupancy dependent heat gains. To meet the space air temperature set-point, the VAV air flow damper and a reheat hot water valve may be controlled in closed loops. Thus, the set-point rule validates the effectiveness of the control.

Faults cause failures (e.g., symptoms or manifestations). The relations between faults and failures are an m-to-n relation. The failure rules described above may result in continuous values that define a failure probability. Associative networks express n-to-m relations. Applied to fault diagnosis, an associative network defines an m×n-matrix D (e.g., a diagnostic matrix) between a fault set $F=\{f_1, f_2, \ldots, f_m\}$ and a symptom set $S=\{s_1, s_2, \ldots, s_n\}$. The elements $g_{i,j}$ of matrix D are either zero (e.g., no relation) or represent a positive or negative failure value:

$$\begin{bmatrix} g_{1,1} & \cdots & g_{1,m} \\ \vdots & \ddots & \vdots \\ g_{n,1} & \cdots & g_{n,m} \end{bmatrix} \quad (9)$$

Accordingly, the matrix D may not be a binary diagnostic matrix, as used by other diagnostic methods. A column vector j of the diagnostic matrix D may be a signature of fault j. With a single fault assumption, fault diagnosis is the task to find, at each time step, the signature that best fits the rule vector.

Fitting rule vectors and fault signatures may be a pattern-matching problem. Exhaustive tests may be possible. In one embodiment, a sum of products may be used to calculate a matching score $C_j$ for each signature at every time step. In another embodiment, the square root of the products may be used to calculate the matching score $C_j$ for each signature at every time step:

$$c_{i,j}=\text{sign}(r_i \times g_{i,j}) \times \sqrt{([(\text{abs}(r))]_i \times g_{i,j})} \quad (10)$$

$$C_j = \Sigma_{i=1}^{n} c_{i,j} \quad (11)$$

If $r_i$ and $g_{i,j}$ are both greater or both less than zero, the rule i score $c_{i,j}$ is positive and contributes positively to the total score $C_j$. If $r_i$ and $g_{i,j}$ have opposite signs, the rule i score $c_{i,j}$ is negative and contributes negatively to the total score $C_j$. If one or both of $r_i$ and $g_{i,j}$ are zero, the contribution is zero. The highest matching score may indicate that the corresponding fault has the highest probability of causing the reported failures. The top five scores, for example, may be reported at every time step to a user at a display, for example, as an indication of the faults that may be further analyzed. More or fewer scores may be reported. In one embodiment, only the top score is reported. Different metrics may also be used for pattern matching.

The quality of the FDD may depend on the entries in the diagnostic matrix. In one embodiment, the HFM of the HVAC system 100 or another HFM (e.g., a more detailed model) may be used to simulate the observed HVAC system 100 to generate rule vectors that may be entered as signatures into the matrix D. During fault simulation, average values (e.g., temperature values) may be calculated at the nodes (e.g., the first node 402) of the HFM of the HVAC system 100, for example. The average values may only be propagated in the mass flow direction. The simulation is distributed to the nodes and creates sensor and actuator values at each time step that replace the data inputs from the BEMCS during the diagnosis phase.

A transformation node (see FIG. 5) may be extended for fault simulation within the HFM. The FDD of the present embodiments may be controlled to execute in three phases: detection phase; simulation phase; and diagnostic phase. In the detection phase, at the beginning of each time step, state variables are estimated, as discussed above, and propagated forward and backward. The failure rule results are stored as local variables of the rule vector R. If any nonzero failure values are detected during the detection phase, fault simulation is triggered followed by a subsequent diagnostic phase.

A simulation component (e.g., fSim component) reads a SimIn state vector and a SimCtrl input, checks a FaultIn fault id, and calculates a SimOut vector. A fault may only be applied if the node recognizes an assigned fault id. Otherwise, a normal fault free simulation may take place. The simulation may use iterations because the mass flows form loops, and control values are fed back against the flow. The number of iterations may be determined experimentally to provide stability.

In one embodiment, the transformation node may represent a heating coil, and a simulation output temperature of the heating coil may be calculated as:

$$T_{SimOut}=T_{SimIn}+fuhc \times HT \quad (12)$$

The air flow rate may be assumed to change very little. Therefore, the temperature increase across the heating coil represented by the node may be assumed to be independent of the air flow rate. HT is the average of the upper and lower limits of the coil temperature increase parameters that are used for the estimation functions. fuhc is in the range of 0 to 1, where fuhc is a faulty valve control signal calculated from equation (13):

$$fuhc=\text{limit}(SimCtrl+f,0,1) \quad (13)$$

The fault value f is 0 for no fault, −1 for stuck closed, >0 for leaking, and 1 for stuck open. The limit function limits fuhc between the two parameters (e.g., between 0 and 1 in equation (13)). For the exemplary node, the fault directly influences SimOut but does not influence the detection part of the node. An influence may be fed back through SimCtrl. SimCtrl is generated by a simulated controller. It may be assumed that a supply sensor duct node Sduct receives a supply air temperature set point from the BEMCS and generates control signals for the heating coil represented by the node, and a cooling coil and an economizer represented by other nodes. Control signals may be normalized to the range of 0 to 1.

During the diagnostic phase, the estimations and rule evaluations take place. The components for the signature vector are produced. By applying equations (10) and (11), ScoresOut is created as a partial vector of rule scores that has components $c_{i,j}$ for computing $C_j$ for the fault j in a central diagnosis component. The phases alternate between the simulation and the diagnostic phase for all faults including no fault. The diagnostic matrix D is thus created dynamically for the external conditions at the time step. The diagnostic matrix D may or may not be stored in the memory of the computing device. The scores of all faults may be sorted by values, and the top scores may be reported to the BEMCS for further manual fault localization and repair.

Sensor faults may not have direct influence on the fault simulation, but may have influence on the estimation and the rule evaluation. Sensor faults may also influence control signal calculations. Simulation values may not be changed from in to out in a node (e.g., the first node 402) representing a supply sensor duct, for example.

In another embodiment, faults of an assumed fault list for the HVAC system 100, for example, may be inserted (e.g., offline) into the observed HVAC system 100, and the FDD may generate the rule vectors that may be entered as signatures into the matrix D. Elements of the matrix D, however, are not independent of the environment. Weather conditions, manually controlled set-points, and occupancy, for example, influence failure rule manifestations strongly. Multiple matrices may be generated for a set of external condition combinations. The generation of the multiple matrices, however, increases computation time and the resources used for FDD.

Figure 9:
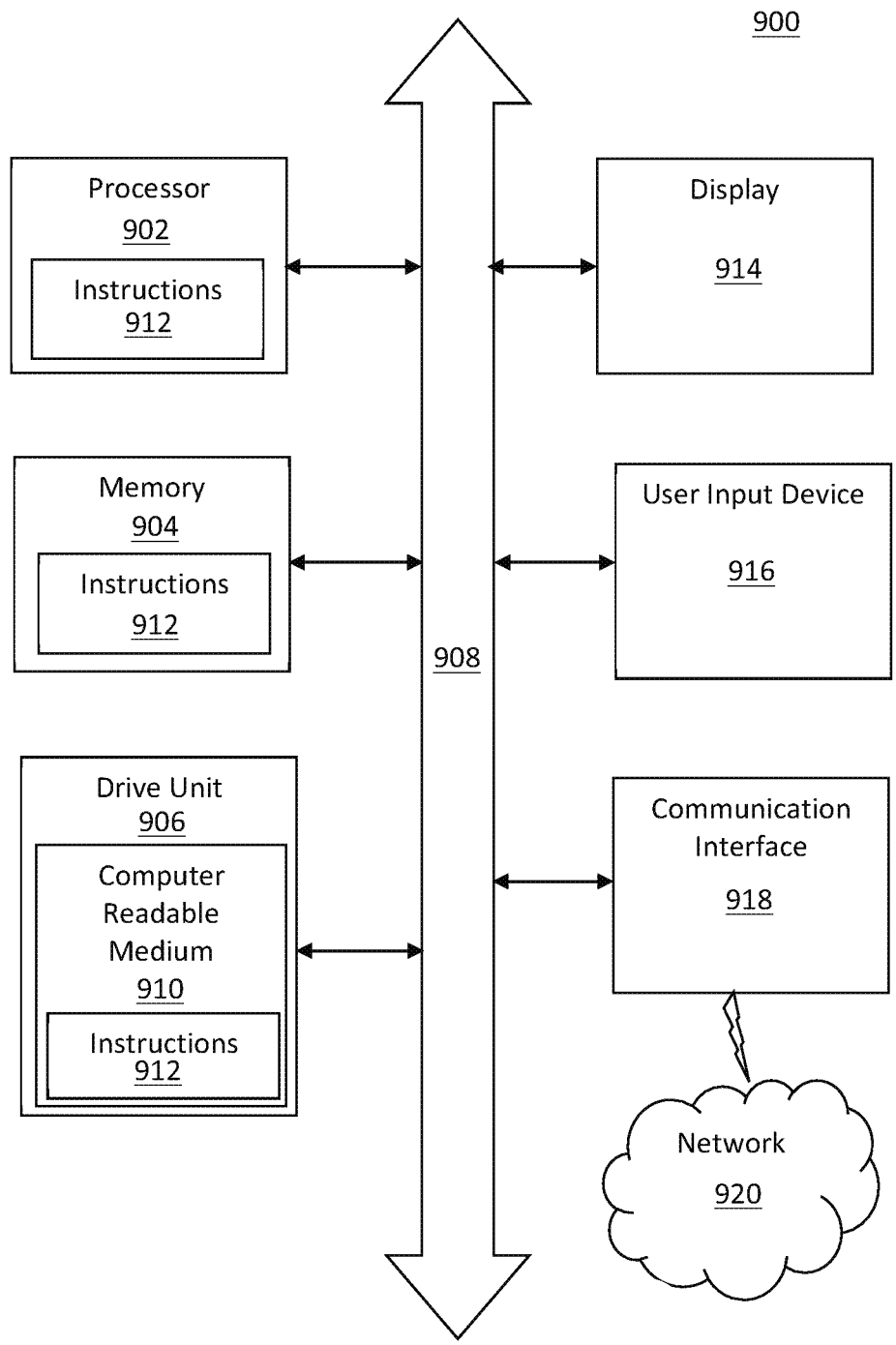
FIG. 9 shows one embodiment of a computer system used for fault detection and diagnosis (FDD)

FIG. 9 shows an illustrative embodiment of a general computer system 900. The computer system 900 may include a set of instructions that may be executed to cause the computer system 900 to perform any one or more of the methods or computer based functions disclosed herein. The computer system 900 may operate as a standalone device or may be connected to other computer systems or peripheral devices. Any of the components discussed above (e.g., the computing device) may be a computer system 900 or a component in the computer system 900.

In a networked deployment, the computer system 900 may operate in the capacity of a server or as a client user computer in a client-server user network environment, or as a peer computer system in a peer-to-peer (or distributed) network environment. The computer system 900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a control system, a personal trusted device, a web appliance, or any other machine capable of executing a set of instructions sequential or otherwise) that specify actions to be taken by that machine. In one embodiment, the computer system 900 may be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902 (e.g., a central processing unit (CPU)), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that may communicate via a bus 908. The memory 904 may be a main memory, a static memory, or a dynamic memory. The memory 904 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 904 includes a cache or random access memory for the processor 902. In alternative embodiments, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 914, such as a liquid crystal display (LCD), an organic light emitting diode (OLED), a flat panel display, a solid state display, a cathode ray tube (CRT), a projector, a printer or other now known or later developed display device for outputting determined information. The display 914 may act as an interface for the user to see the functioning of the processor 902, or specifically as an interface with the software stored in the memory 904 or in a disk or optical drive unit 906 (e.g., a disk drive unit).

Additionally, the computer system 900 may include an input device 916 configured to allow a user to interact with any of the components of system 900. The input device 916 may be a number pad, a keyboard, or a cursor control device, such as a mouse, or a joystick, touch screen display, remote control or any other device operative to interact with the system 900.

In one embodiment, as depicted in FIG. 9, the computer system 900 may also include the disk or optical drive unit 906. The disk drive unit 906 may include a computer-readable medium 910, in which one or more sets of instructions 912 (e.g., software) may be embedded. Further, the instructions 912 may embody one or more of the methods or logic as described herein. In one embodiment, the instructions 912 may reside completely, or at least partially, within the memory 904 and/or within the processor 902 during execution by the computer system 900. The memory 904 and the processor 902 also may include computer-readable media as discussed above.

The present disclosure contemplates a computer-readable medium that includes instructions 912 or receives and executes instructions 912 responsive to a propagated signal, so that a device connected to a network 920 may communicate voice, video, audio, images or any other data over the network 920. Further, the instructions 912 may be transmitted or received over the network 920 via a communication port 918. The communication port 918 may be a part of the processor 902 or may be a separate component. The communication port 918 may be created in software or may be a physical connection in hardware. The communication port 918 is configured to connect with the network 920 or another network, external media, the display 914, any other components in system 900, or combinations thereof. The connection with the network 920 may be a physical connection, such as a wired Ethernet connection or may be established wirelessly as discussed below. Likewise, the additional connections with other components of the system 900 may be physical connections or may be established wirelessly.

The network 920 may include wired networks, wireless networks, or combinations thereof. The wireless network may be a cellular telephone network, an 802.11, 802.16, 802.20, or WiMax network. Further, the network 920 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media (e.g., a centralized or distributed database and/or associated caches and servers that store one or more sets of instructions). The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In one embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

Figure 10:
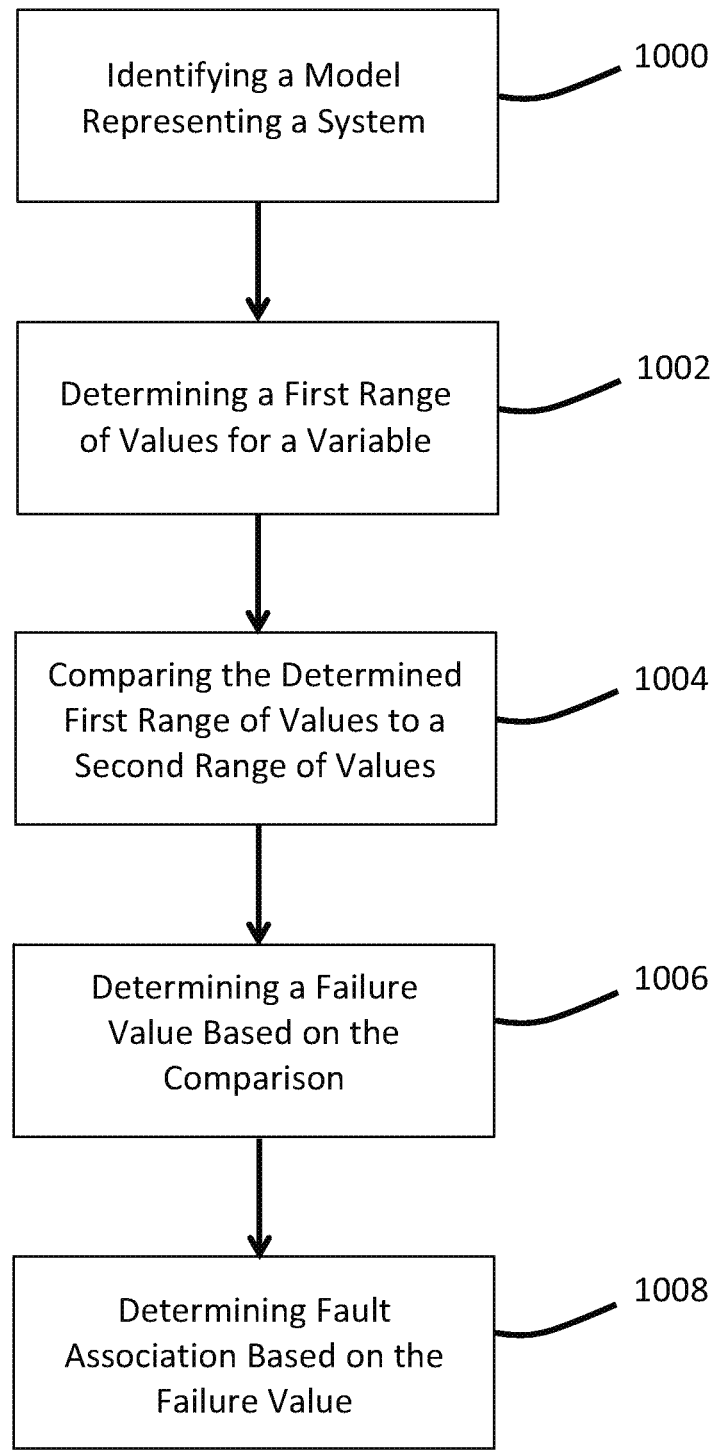
FIG. 10 shows a flowchart of one embodiment of a method for diagnosing a fault in a system.

FIG. 10 shows a flowchart of one embodiment of a method for diagnosing a fault in a system. The method may be performed using the system 900 shown in FIG. 9 or another system. The method is implemented in the order shown, but other orders may be used. Additional, different, or fewer acts may be provided. Similar methods may be used for diagnosing a fault in a system.

The method includes identifying a model representing a system (act 1000). The system may be a heating, ventilation, and air conditioning (HVAC) system. The model may be a heat flow model (HFM) that represents the HVAC system. The HFM is a graph having a plurality of nodes that corresponds to a plurality of HVAC system components. The plurality of nodes may represent simple and complex HVAC system components. The HVAC system components may include, for example, valves, coils (e.g., heating coils and cooling coils), fans, variable air volumes (VAVs), and air handling units (AHUs). The plurality of nodes are connected to each other via arcs or edges (e.g., directed arcs) that correspond to mass flow connections such as, for example, ducts, pipes, or electrical energy flows in power lines. The arcs or edges may pass data to nodes upstream and downstream of a node. In other embodiments, the system may be an airplane, a power plant, or another system.

The model may be received at an input of a computing system, may be retrieved from a memory of the computing system, or may be generated by a processor of the computing system. In one embodiment, a building information model (BIM) may be identified by the processor of the computing system. The BIM is a digital representation of physical and functional characteristics of a facility (e.g., industry foundation classes (IFC) models), IFC models of existing or planned buildings may be used to automatically create a fault detection and diagnosis (FDD) system. Alternatively, a user at the computing device, for example, may select modules (e.g., nodes) that represent the components of the HVAC system, for example, from a library of modules stored in the memory or another memory and arrange the modules within a graphical user interface (GUI) at the computing device to represent the HVAC system. The user may also be able to connect the nodes within the GUI, such that data may be passed between the different connected nodes.

The method also includes determining a first range of values for a variable (act 1002). The variable may represent a state associated with at least a component of the plurality of HVAC components. For example, the variable may represent a temperature, a flow rate, a pressure, or a humidity upstream of, at, or downstream of the component. The first range of values may be a valid interval for the variable at a first node of the plurality of nodes, for example. In other words, the first range of values may indicate a range of values, at which no failures are present at the first node. Determining the first range of values for the variable may include estimating the valid interval for the variable based on knowledge about properties of the HVAC component (e.g., estimating a change in the variable across the component) the first node represents, state variables of nodes connected to the first node (e.g., upstream and downstream) and dynamic inputs from the HVAC system (e.g., sensor values, set-points, control values). The estimated interval may be propagated to the upstream and downstream nodes connected to the first node through the directed arcs connecting the first node to the upstream and downstream nodes. A first range of values for the variable may be determined for each node of the plurality of nodes. First ranges of values may be determined for a plurality of variables (e.g., representing temperature and flow rate).

The method also includes comparing the determined first range of values for the variable to a second range of values for the variable (act 1004). The second range of values for the variable may be a second interval that is related to the valid interval. In other words, the second range of values (e.g., the second interval) and the first range of values (e.g., the valid interval) may be related. Related intervals are, for example, a sensor value (e.g., a temperature) determined by a sensor of the HVAC system and identified by the processor of the computing system with applied sensor tolerances stored in the memory of the computing system, and an estimated interval propagated from the node downstream of the first node or the node upstream of the first node. Comparing the determined first range of values for the variable to the second range of values for the variable may include determining whether the first range of values for the variable and the second range of values for the variable overlap. The determined first range of values for the variable may be compared to a second range of values for the variable for each node of the plurality of nodes. A first range of values for the variable may be compared to a second range of values for the variable for a plurality of variables (e.g., representing temperature and flow rate).

The method includes determining a failure value based on the comparison (act 1006). The failure value may represent a probability that a fault exists at the first node, for example. If the first range of values for the variable and the second range of values for the variable (e.g., the related intervals) overlap, a failure value of zero may be determined. If the first range of values for the variable and the second range of values for the variable do not overlap, a fault may be assumed, and the failure value may be based on a relative distance between the related intervals. For example, the determined failure value may be based on a difference between a minimum of the first range of values and a maximum of the second range of values or on a difference between a maximum of the first range of values and a minimum of the second range of values. A failure value may be determined for each node of the plurality of nodes to populate a rule vector (e.g., a failure vector, a failure output vector). The rule vector may be normalized by any number of factors including, for example, an expected state variable range. The rule vector may be determined at a number of time steps (e.g., every five minutes).

The method also includes determining when the fault is associated with the component based on the failure value (act 1008). One or more fault signature matrices may be generated. Generating the one or more fault signature matrices may include simulating the HFM representing the HVAC system to populate the one or more fault signature matrices. The HFM representing the HVAC may be simulated by calculating average values for the variable instead of intervals. During simulation, the average values may only be propagated in the mass flow direction. The HFM representing the HVAC system may simulate one or more faults in the system, and the one or more faults may include the fault.

The normalized rule vector (e.g., including the failure value) may be compared to the one or more fault signature matrices. The normalized rule vector and the one or more fault signature matrices may be compared using, for example, pattern matching. Different metrics such as, for example, the sum of products and the square root of products may be used for the pattern matching. Resulting scores (e.g., using the sum of products or the square root of products) may be generated. The highest matching score may indicate that the fault has the highest probability of causing the reported failures e.g., as identified in the rule vector). Scores in addition to the highest matching score may be presented (e.g., displayed) to a user at the computing device, as an indication of which faults should be further analyzed.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for diagnosing a fault in a system, the system comprising a plurality of components, the method comprising:
   receiving from at least one sensor in a processor, a first range of values for a variable representing a state associated with each of at least two components of the plurality of components;
   comparing in the processor the determined first range of values for the variable to a corresponding second range of values for the variable to determine if an overlap of the first range and the second range of values exists;
   determining by the processor a failure value associated with each of the at least two components based on the comparison on a condition that an overlap between the first range of values and the second range of values does not exist;
   generating a failure vector based on the failure values, wherein the failure vector is mapped to the fault in the system;
   determining when the fault is associated with the at least two components based on comparing the failure vector to fault signature matrices generated in real-time from a heat flow model of the system;
   reporting the fault to a building energy management and control system for manual fault localization and repair.

2. The method of claim 1, further comprising generating the heat flow model of the system model representing the system, the model including a plurality of nodes, the plurality of nodes representing the plurality of components of the system, wherein the first range of values is determined, the first range of values is compared to the second range of values, and the failure value is determined for each node of the plurality of nodes.

3. The method of claim 2, wherein the generated model represents a heating, ventilation, and air condition (HVAC) system.

4. The method of claim 3, wherein each of the at least two components comprise one or more of a sensor, a valve, a fan, a heating coil, a cooling coil, and a variable air volume (VAV).

5. The method of claim 1, wherein the variable represents a temperature, a flow rate, a pressure, or a humidity upstream of, at, or downstream of each of the at least two components.

6. The method of claim 1, wherein determining the first range of values comprises estimating a change in the variable across of each of the at least two components.

7. The method of claim 1, further comprising measuring a value for the variable using a sensor downstream of, at, or upstream of each of the at least two components, and
determining the second range of values based on the measured value for the variable and a tolerance of the sensor.

8. The method of claim 7, wherein the determined failure value is based on a difference between a minimum of the first range of values and a maximum of the second range of values or between a maximum of the first range of values and a minimum of the second range of values.

9. The method of claim 1, wherein determining when the fault is associated with the component based on the failure value comprises;
generating one or more fault signature matrices; and
comparing the one or more fault signature matrices to the failure vector,
wherein generating the one or more fault signature matrices comprises simulating the system using the heat flow model of the system to populate the one or more fault signature matrices, the model representing the system simulating one or more faults in the system, the one or more faults comprising the fault.

10. The method of claim 1, wherein the component is a first component of the plurality of components, and
wherein determining the first range of values for the variable comprises identifying a range of values for the variable associated with a second component of the plurality of components, the second component being located upstream of the first component.

11. In a non-transitory computer-readable storage medium that stores instructions executable by one or more processors to identify an origin of a fault in a system, the system comprising a plurality of components, the instructions comprising:
determining, for each of at least two components of the plurality of components, a valid first interval for a variable representing a state associated with the component;
determining, for each of the at least two components of the plurality of components, a second interval for the variable representing the state associated with the at least two components of the plurality of components;
comparing, for each component of the at least two components, the second interval to the valid first interval to identify a failure when the valid first interval and the second interval do not overlap;
generating a vector representing identified failures of the at least two components based on the comparisons;
constructing a diagnostics matrix where each column of the diagnostics matrix contains the generated vector for an identified failure;
simulating a model representing the system for a plurality of potential faults, the plurality of potential faults comprising the fault;
comparing a result of the simulation to the generated vectors in the diagnostics matrix;
identifying the origin of the fault based on the comparison between the result of the simulation and the generated vector; and
reporting the fault to a building energy management and control system for manual fault localization and repair.

12. The non-transitory computer-readable storage medium of claim 11, wherein the state associated with the component comprises a temperature, a flow rate, a pressure, or a humidity upstream of, at, or downstream of the component.

13. The non-transitory computer-readable storage medium of claim 11, wherein determining the second interval for the variable comprises:
measuring a value for the variable using a sensor downstream of, at, or upstream of the component; and
adding a tolerance of the sensor to the measured value for the variable and subtracting the tolerance of the sensor to the measuring value for the variable.

14. The non-transitory computer-readable storage medium of claim 11, wherein comparing the second interval to the valid first interval comprises:
determining whether the second interval and the valid first interval overlap; and
calculating, when the second interval and the valid first interval do not overlap, a difference between a minimum of the valid first interval and a maximum of the second interval or a difference between a minimum of the second interval and a maximum of the valid first interval.

15. The non-transitory computer-readable storage medium of claim 11, wherein determining the valid first interval for the variable for a first component of the at least two components identifying a range of values for the variable associated with a second component of the at least two components, the second component being located upstream of the first component.

16. A system for identifying an origin of a fault in a thermodynamic system, the thermodynamic system comprising a plurality heating, ventilation and air conditioning (HVAC) components, the system comprising:
an input operable to receive data for a variable representing a state associated with each of at least two HVAC components of the plurality of HVAC components;
a processor operatively connected to the input, the processor configured to:
determine a valid first range of values of each variable;
determine a second range of values for each variable based on the received data;
compare the determined valid first range of values for the variables to the second range of values for the variables;
determine a failure value associated with each component based on the comparison, each failure value at least partially representing a probability that the fault is at the corresponding HVAC component;

determine a failure vector based on the failure values and determine when the fault is associated with at least one of the HVAC component based on comparing the failure vector to fault signature matrices generated in real-time from a heat flow model of the thermodynamic system; and reporting the fault to a building energy management and control system for manual fault localization and repair.

17. The system of claim 16, wherein the input is operable to receive the data from a sensor.

18. The system of claim 17, wherein the sensor is a sensor operable to measure a temperature, a flow rate, a pressure, or a humidity.

* * * * *